July 21, 1970 H. JONES 3,521,369

UNIVERSAL PLUMB BOB LEVEL DEVICE

Filed Feb. 23, 1968

INVENTOR

HICKS JONES

BY Barthel & Bugbee

ATTORNEYS

United States Patent Office
3,521,369
Patented July 21, 1970

3,521,369
UNIVERSAL PLUMB BOB LEVEL DEVICE
Hicks Jones, 7096 Fourteen Mile Road,
Warren, Mich. 48092
Filed Feb. 23, 1968, Ser. No. 707,811
Int. Cl. G01c *15/10*
U.S. Cl. 33—216 1 Claim

ABSTRACT OF THE DISCLOSURE

This universal plumb bob level device is housed in a transparent box from the top wall of which is pivotally suspended a pointed plumb bob registering with a cross-line target on the bottom wall. One side wall has an extension engageable with a mounting block against which it is releasably pressed by a leaf spring projecting from the opposite side wall while the rear wall is held in face-to-face engagement with the front or abutment surface of the mounting block.

Figure 1:
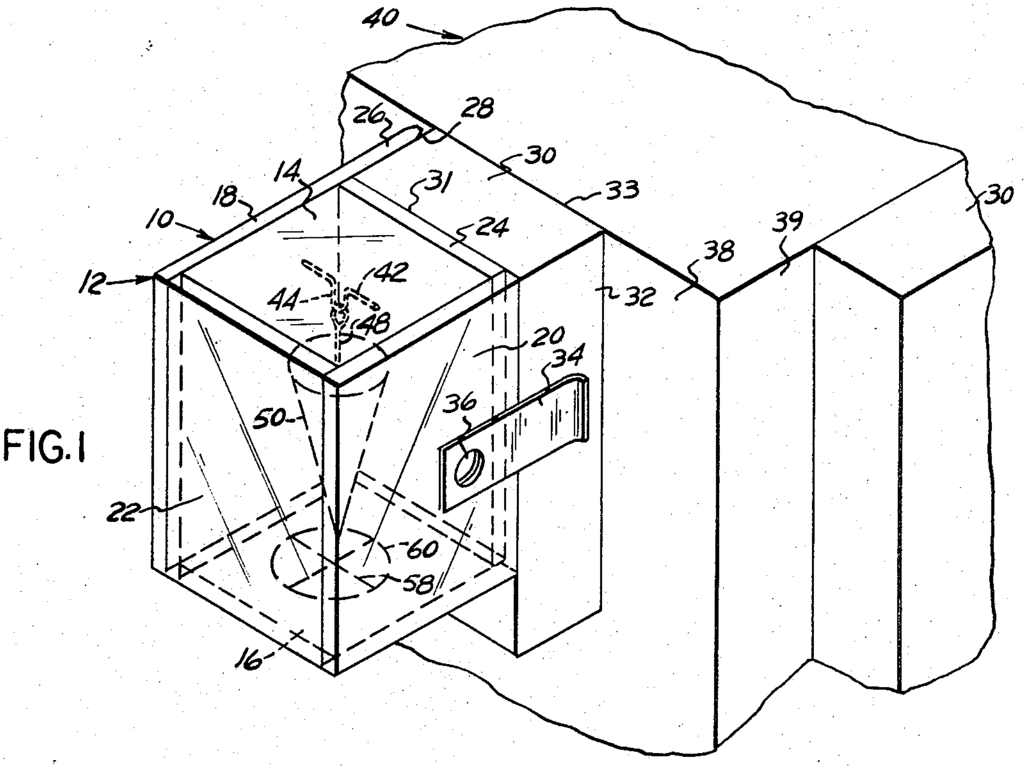
FIG. 1 is a top perspective view of a universal plumb bob level device, according to one form of the invention.
Figure 2:
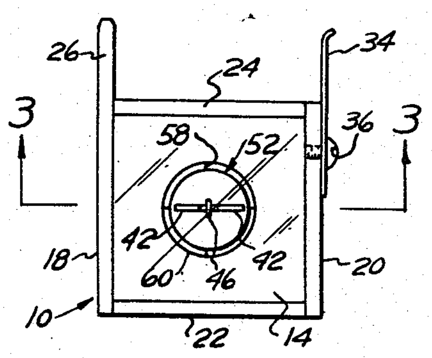
FIG. 2 is a top plan view thereof.
Figure 4:
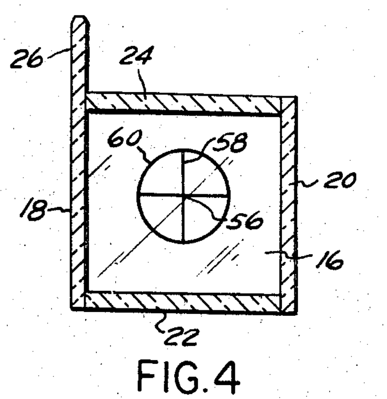
FIG. 4 is a horizontal section taken along the line 4—4 in FIG. 3.

Referring to the drawing in detail, FIG. 1 shows in perspective a universal plumb bob level device 10 housed in a transparent casing or box 12 formed in whole or in part of transparent material, such as clear transparent plastic. The casing 12 has top and bottom walls 14 and 16 respectively, opposite side walls 18 and 20 and front and rear walls 22 and 24 respectively constituting connecting walls joining the top and bottom walls 14 and 16 in vertically-spaced relationship. The side wall 18 has a rearward extension or projection 26 the inner surface of which constitutes a side reference surface adapted to engage a side or first guide surface 28 of a mounting member or block 30 while the rear surface of its rear wall 24 constitutes a rear or second reference surface adapted to engage a front or second guide surface 31 on the mounting block 30. The latter has a rear surface 33, the opposite side surface 32 being resiliently engaged by a leaf spring 34 projecting rearwardly from the side wall 20 having an outwardly-curved free end portion 35. From FIGS. 2 and 4 it will be seen that the opposite side walls 18 and 20 and the extension 26 are perpendicular to the front and rear walls 22 and 24. The spring 34 is secured thereto as by a fastener 36.

One mounting block 30 is adapted to be permanently secured, as by fasteners (not shown) to each of two mutually perpendicular side walls 38 and 39 of a house trailer 40 or other object to be leveled, and is permanently secured thereto after the opposite parallel sides 28 and 32 have been adjusted to be accurately vertical, by conventional carpenters' levels, after the trailer 40 has also been accurately leveled in the same manner by precisely jacking it into such level positions wherein the side walls 38 are accurately vertical and the bottom wall or floor (not shown) is precisely horizontal.

Figure 3:
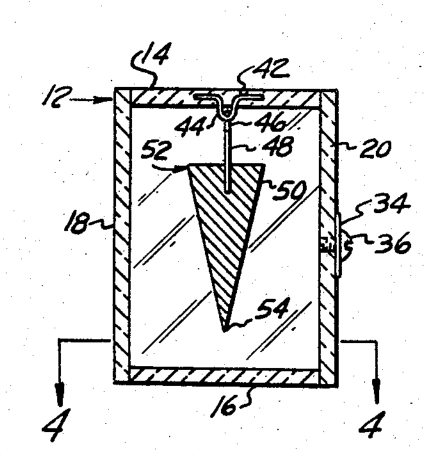
FIG. 3 is a central vertical section taken along the line 3—3 in FIG. 2.

Mounted in and depending from the top wall 14 of the casing 12 (FIGS. 1 and 3) is a pivotal support 42 with a central loop 44 from which is pivotally suspended the eye 46 at the top of a suspension wire 48, the lower end of which is embedded in the approximately conical weight 50 of a plumb bob, generally designated 52. The sharp tip 54 at the lower end of the weight 50 serves as a pointer which is caused to register with a reference mark or point 56 at the intersection of the cross lines 58 of a target 60 inscribed or otherwise disposed on the bottom wall 16 of the casing 12 (FIG. 4) when the rear surface or second reference surface of the rear wall 24 of the universal plumb bob level device 10 is in a precisely vertical position, against the accurately-vertical front surface or abutment surface 31 of the mounting block 30.

In the use of the universal plumb bob level device 10 to level a house trailer 40, let it be assumed that two mutually-perpendicular vertical walls 38 and 39 thereof have been provided with accurately vetrical mounting blocks 30 in the manner described above. Let it further be assumed that the trailer 40 has subsequently been towed to another location and is to be levelled. To do so, the user grasps the opposite side walls 18 and 20 of the plumb bob casing 12 between the thumb and forefinger of one hand and pushes the casing 12 rearwardly toward the mounting block 30 until the extension 26 of the side wall 18 firmly engages the first guide surface formed by the side surface 28 of the mounting block 30 and is held thereagainst by the leaf spring 34 the opposite side surface 32 of the mounting block 30 (FIG. 1). When the rear surface or second reference surface on the rear wall 24 of the casing 12 has been pushed into face-to-face engagement with the second guide surface formed by the front surface or abutment surface 31 of the mounting block 30, the reference surfaces and the guide surfaces are in mating engagement with one another and the plumb bob level device 10 is in its proper position.

The user now examines the position of the pointed tip 54 of the plumb bob 52 relatively to the intersection point or mark 56 of the cross lines 58 of the target 60. If the tip 54 does not lie directly above the said intersection 56, the user adjusts the jacks by which he is seeking to level the trailer 40 in a conventional manner until the pointed tip 54 registers with the cross line intersection 56. The operator then detaches the plumb bob level device 10 from the mounting block 30 on the side wall 38 and reattaches it to the other mounting block 30 on the perpendicular side wall 39 and repeats the jacking operation to level the trailer 40 in a transverse direction.

It will be understood, of course, that by attaching one of the plumb bob level devices 10 to each of the two mutually perpendicular mounting blocks 30 and observing them simultaneously while jacking the trailer 40, the latter can be leveled more rapidly and more easily than when using only one level device 10 in the above-described manner.

I claim:

1. A quick-attachable and quick-detachable universal plumb bob level device adapted to fit against a right-angled corner portion on the structure to be levelled, said device comprising:

a hollow rectangular box-shaped casing at least partially of transparent material having a top wall, a bottom wall, a front wall, a rear wall, and parallel opposite side walls perpendicular to said rear wall, one of said side walls extending rearwardly past said rear wall and defining therewith a corner reference portion with mutually perpendicular adjacent reference surfaces, a plumb bob pivotally suspended from said top wall and having a plumb-indicating pointer at the lower end thereof, a target on said bottom wall having a plumb-indicating reference mark thereon registering with said pointer in response to the positioning of said reference surfaces in mutually-perpendicular vertical planes, and a leaf spring secured to the other of said side walls and extending rearwardly of said rear wall in spaced relationship to said rearwardly-extending side wall;

said top wall, said bottom wall, said rear wall and said rearwardly-extending side wall being unitarily joined to one another against relative motion therebetween.

References Cited

UNITED STATES PATENTS

| | | | |
|---|---|---|---|
| 1,066,013 | 8/1913 | Henning | 33—207 |
| 1,340,995 | 5/1920 | Werner | 33—216 |
| 1,925,745 | 3/1934 | Deasy | 33—216 |
| 2,184,505 | 12/1939 | Danley | 33—216 |
| 3,146,529 | 9/1964 | Chamberlin | 33—207 |

LEONARD FORMAN, Primary Examiner

D. A. DEARING, Assistant Examiner

U.S. Cl. X.R.

33—207